US008422104B2

(12) United States Patent
Matsuda (10) Patent No.: US 8,422,104 B2
(45) Date of Patent: Apr. 16, 2013

(54) IMAGE PROCESSING APPARATUS, IMAGE PROCESSING METHOD, AND COMPUTER-READABLE RECORDING MEDIUM STORING IMAGE PROCESSING PROGRAM

(75) Inventor: Kohji Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1026 days.

(21) Appl. No.: 12/404,509

(22) Filed: Mar. 16, 2009

(65) Prior Publication Data

US 2009/0231633 A1 Sep. 17, 2009

(30) Foreign Application Priority Data

Mar. 17, 2008 (JP) ................................. 2008-067958

(51) Int. Cl.
*G03F 3/10* (2006.01)
*G06F 3/12* (2006.01)
*H04N 1/60* (2006.01)
*G06K 15/00* (2006.01)

(52) U.S. Cl.
USPC ............ 358/527; 358/1.15; 358/1.1; 358/1.9; 358/1.18

(58) Field of Classification Search .................. 358/527, 358/448, 1.18, 1.1, 1.15, 1.13, 537, 538, 358/474, 498, 1.9, 1.6, 451, 1.16, 1.17; 715/513, 715/530, 522
See application file for complete search history.

(56) References Cited

U.S. PATENT DOCUMENTS

| 7,430,059 B2 * | 9/2008 | Rodrigues et al. ............. 358/1.9 |
| 7,692,823 B2 * | 4/2010 | Minowa et al. ............... 358/474 |
| 8,139,255 B2 * | 3/2012 | Matsunaga .................. 358/1.16 |
| 8,264,713 B2 * | 9/2012 | Takeuchi et al. ............. 358/1.15 |
| 2005/0157351 A1 | 7/2005 | Matsuda |
| 2006/0126125 A1 | 6/2006 | Matsuda et al. |
| 2006/0262341 A1 | 11/2006 | Matsuda |
| 2007/0035771 A1 * | 2/2007 | Kitamaru ..................... 358/1.18 |
| 2007/0236753 A1 * | 10/2007 | Watanabe ..................... 358/448 |
| 2007/0285708 A1 | 12/2007 | Matsuda |

FOREIGN PATENT DOCUMENTS

| JP | 8-317185 | 11/1996 |
| JP | 2001-285612 | 10/2001 |
| JP | 2006-41947 | 2/2006 |
| JP | 2006-126401 | 5/2006 |
| JP | 2007-288621 | 11/2007 |

OTHER PUBLICATIONS

Japanese Office Action issued Jan. 31, 2012, in Patent Application No. 2008-067958.

* cited by examiner

*Primary Examiner* — Charlotte M Baker
(74) *Attorney, Agent, or Firm* — Oblon, Spivak, McClelland, Maier & Neustadt, L.L.P.

(57) ABSTRACT

An image processing apparatus is disclosed. In the image processing apparatus, when preview images and/or thumbnail images of image data of plural documents read by a scanner section are formed, a preview image and/or a thumbnail image of the image data of a document is formed before the scanner section starts to read image data of a next document, and the formed preview image and/or the formed thumbnail image is stored in a storage unit. When the preview image and/or thumbnail image is displayed, the stored preview image and/or the stored thumbnail image is displayed so that the image processing apparatus can immediately and easily display the preview image and/or the thumbnail image while maintaining the productivity of the image processing apparatus.

15 Claims, 9 Drawing Sheets

IMAGE PROCESSING APPARATUS, IMAGE PROCESSING METHOD, AND COMPUTER-READABLE RECORDING MEDIUM STORING IMAGE PROCESSING PROGRAM

BACKGROUND OF THE INVENTION

1. Field of the Invention

The present invention generally relates to an image processing apparatus, an image processing method, and a computer-readable recording medium storing an image processing program in which a preview image and/or a thumbnail image of a document image is displayed by forming the preview image and/or the thumbnail image of the document image.

2. Description of the Related Art

Recently, in image processing apparatuses, in order to reduce the amount of paper to be used in printing, a preview image and/or a thumbnail image of a document image is formed, and in order to perform aggregation printing of plural images, an image reducing process is performed.

For example, in Patent Document 1, a predetermined range of a document to be read is displayed on a preview screen, and editing processes such as an image moving process, an image enlarging process, an image reducing process, and an image density changing process are performed on the preview screen. In Patent Document 2, when finishing items of an output image are determined, finishing conditions of the items are displayed as a preview image.

When a reduced preview image of an image is displayed on a preview screen, and plural images are displayed on the preview screen as a list of thumbnail images by reducing the plural images, reduced images are formed. Generally, when an image is reduced, the sum of the number of pixels of a target region of an input image to be reduced is obtained, the sum of the number of the pixels is divided by the number of pixels of the reduction region, and pixel values of the image to be reduced are obtained. However, the workload of the CPU (central processing unit) is great and a large amount of processing time is required.

That is, in the conventional preview image display, the workload of the CPU has not been studied.

[Patent Document 1] Japanese Unexamined Patent Publication No. 2006-126401

[Patent Document 2] Japanese Unexamined Patent Publication No. 2006-041947

In the conventional technologies of Patent Documents 1 and 2, when a preview image and/or a thumbnail image is to be efficiently displayed, the usability must be studied. That is, the preview image and/or the thumbnail image is a reduced image of an original image and when the preview image and/or the thumbnail image is displayed on image processing apparatuses having different resolutions, plural types of the preview image and/or the thumbnail must be prepared for the plural image processing apparatuses. However, the workload of the CPU in the image processing apparatuses such as a multifunctional apparatus having an image processing function and a copying apparatus becomes great, and the processing time becomes long. Consequently, the usability of displaying the preview image and/or the thumbnail image is lowered. In Patent Documents 1 and 2, only preview image and/or thumbnail image forming and storing processes are disclosed, and the workload of the CPU has not been studied. That is, the usability, for example, shortening the processing time, has not been described.

SUMMARY OF THE INVENTION

In a preferred embodiment of the present invention, there is provided an image processing apparatus, an image processing method, and a computer-readable recording medium storing an image processing program in which usability is increased by immediately displaying a preview image and/or a thumbnail image.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus, an image processing method, and a computer-readable recording medium storing an image processing program particularly pointed out in the specification in such full, clear, concise, and exact terms so as to enable a person having ordinary skill in the art to practice the invention.

To achieve one or more of these and other advantages, according to one aspect of the present invention, there is provided an image processing apparatus. The image processing apparatus includes an image reading unit which reads an image of a document and outputs image data of the read image, a displaying image forming unit which forms an image to be displayed based on the image data, a storage unit which stores the image to be displayed and the image data so that the image to be displayed is related to the image data, and a displaying unit which displays the image to be displayed stored in the storage unit. When the image reading unit sequentially reads plural documents, the displaying image forming unit forms an image to be displayed of a document before the image reading unit starts to read an image of a next document.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

Best Mode of Carrying Out the Invention

The best mode of carrying out the present invention is described with reference to the accompanying drawings.

First Embodiment

Referring to FIGS. 1 through 6, an image processing apparatus according to a first embodiment of the present invention is described. In the first embodiment of the present invention, an MFP (multifunctional peripheral) is used as the image processing apparatus. However, the image processing apparatus is not limited to the MFP. The MFP includes a document reading function, a document copying function, a document facsimile receiving/transmitting function, and so on.

Figure 1:
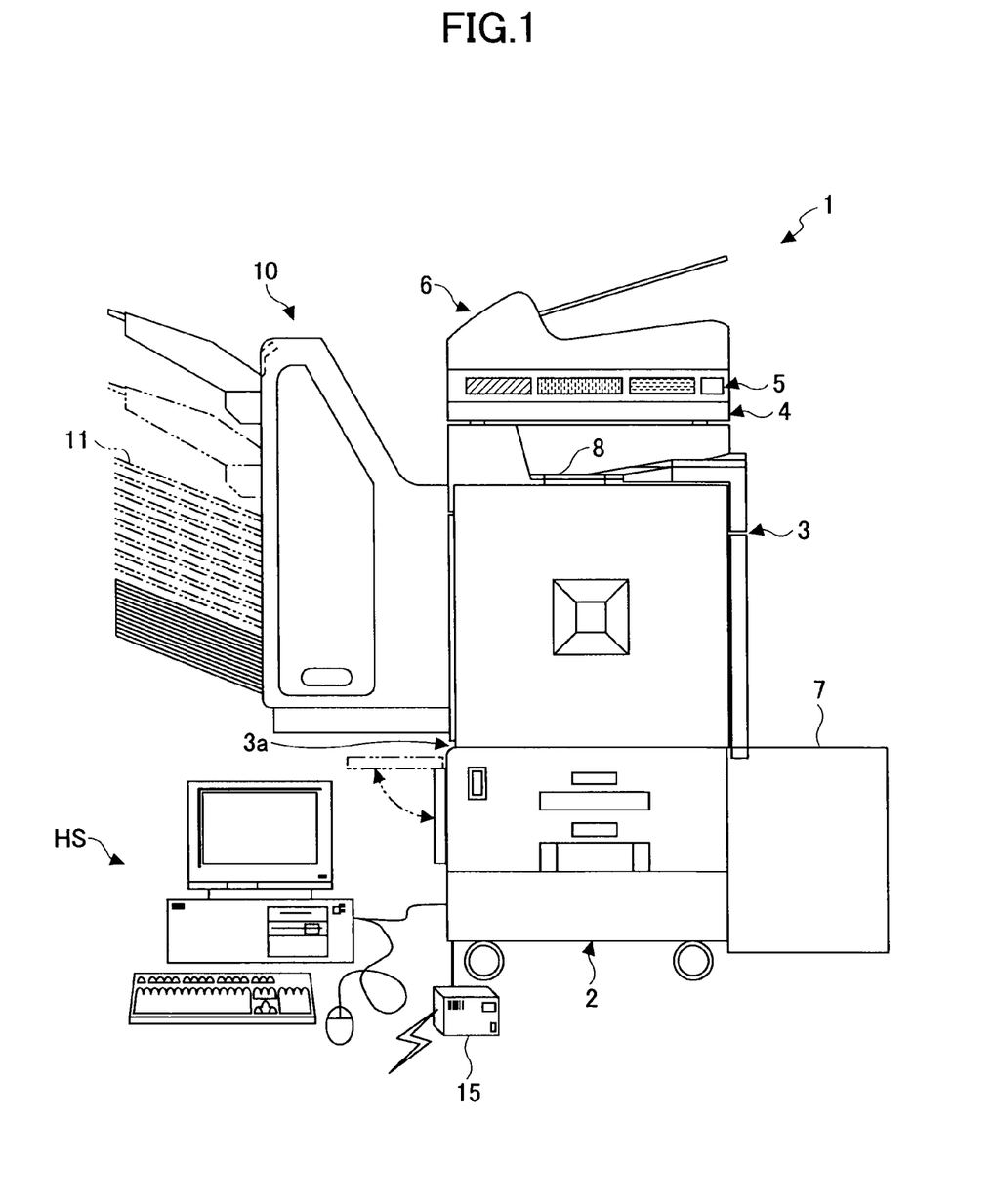
FIG. 1 is a side view of an image processing apparatus according to a first embodiment of the present invention.

FIG. 1 is a side view of the image processing apparatus according to the first embodiment of the present invention.

As shown in FIG. 1, an MFP 1 (image processing apparatus) includes a paper feeding bank 2, a printer section 3, a scanner section 4, an operation displaying section 5, and an ADF (auto document feeder) 6. The above sections (elements) are sequentially stacked from the lower side. A large capacity paper feeding tray 7 for storing a large amount of paper is connected to the paper feeding bank 2. In addition, a finisher 10 is connected to the MFP 1. Further, a paper outputting tray 8 is disposed between the printer section 3 and the scanner section 4.

The paper feeding bank 2 includes plural paper feeding trays (not shown), and different-sized paper and/or different-type paper can be stored in an individual paper feeding tray. The paper feeding bank 2 feeds each paper to the printer section 3 from a paper feeding tray in which designated paper is stored by separating the paper one by one when an image is to be printed on the paper. In addition, when a large number of documents are requested to be printed and the large capacity paper feeding tray 7 is used, the paper feeding bank 2 feeds the paper to the printer section 3 by separating the paper one by one.

The printer section 3 (printing unit) prints an image on paper fed from the paper feeding bank 2 by using, for example, an electrophotographic system, and outputs the paper on which the image has been printed to the paper outputting tray 8 or the finisher 10. The printer section 3 includes a duplex driving unit 3a; and the duplex driving unit 3a reverses paper on whose front surface an image has been printed and transports the paper to a print performing position of the printer section 3, and causes the printer section 3 to print another image on the back surface of the paper, when both-sides printing is performed.

The finisher 10 includes plural paper outputting trays 11, and post-process applying mechanisms such as a stapling mechanism for stapling a bundle of paper on which images have been printed and a punching mechanism for punching the bundle of paper. The finisher 10 applies a post-process designated by a user to the bundle of paper on which the images have been printed and outputs the bundle of paper to the paper outputting tray 11, or performs a sorting function in which each page of plural copies of paper is sequentially output to the corresponding paper outputting tray 11.

The operation displaying section 5 (document direction obtaining unit) includes many operation keys such as a numerical keypad and a start key, and a display (for example, a liquid crystal display). Instructions to be performed such as a facsimile transmission operation, a document copying operation, and a document scanning operation are input from the operation keys. Contents of the instructions input from the operation keys and information to be reported to a user are displayed on the display (displaying unit).

The MFP 1 is connected to a facsimile transmission-capable network, for example, a public telephone line network, via a PBX (private branch exchange) 15, and is also connected to a host apparatus HS. The host apparatus HS causes the printer section 3 to print data by transmitting the data to the MFP 1 and obtains image data read by the scanner section 4.

The scanner section 4 (image reading unit) is, for example, an image scanner using a CCD (charge coupled device), and the ADF 6 is disposed above the scanner section 4. Plural documents are put on the ADF 6, and the ADF 6 feeds the documents one by one to the document reading position of the scanner section 4. The scanner section 4 scans the document fed from the ADF 6 and reads an image of the document with a predetermined resolution by scanning the document, then outputs the image of the document as binary data.

Figure 2:
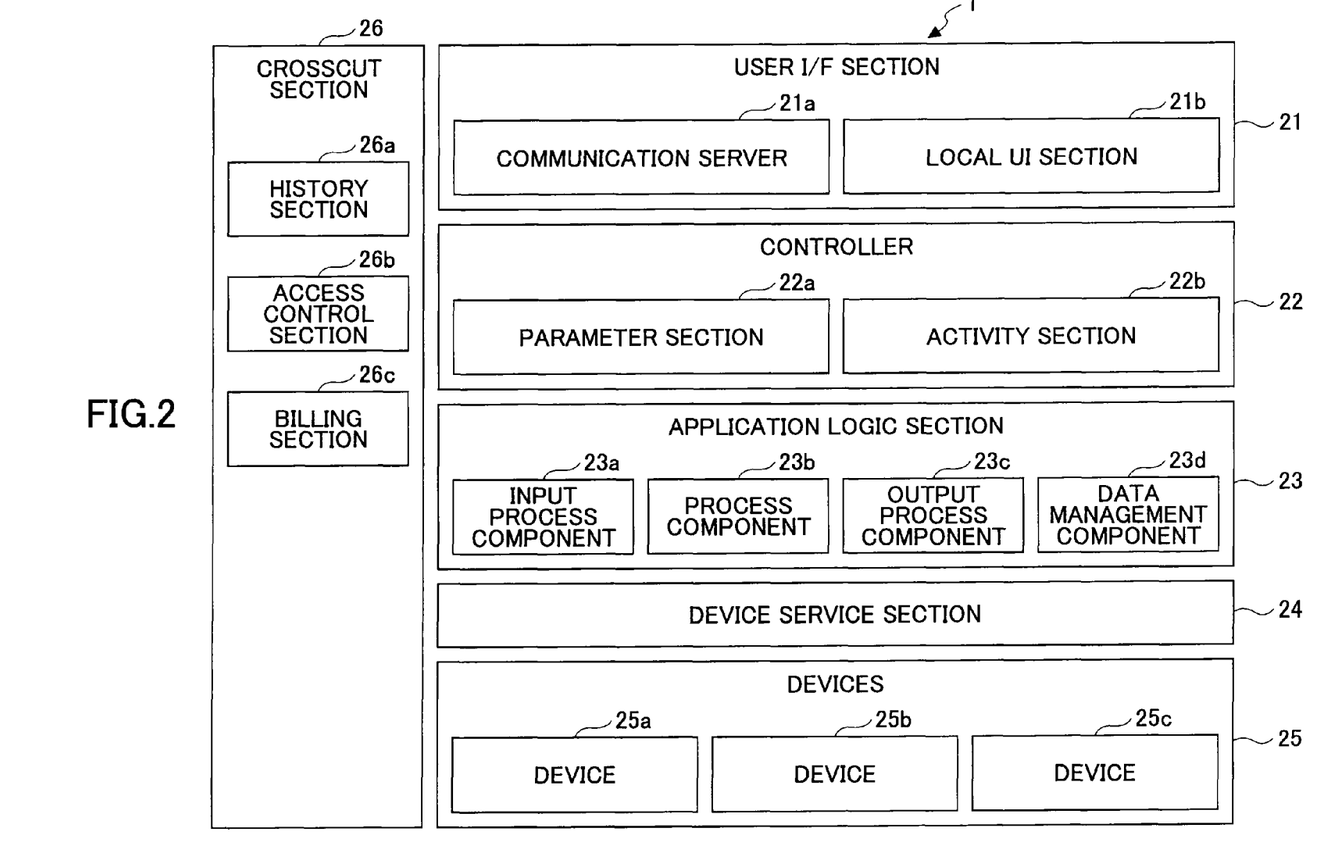
FIG. 2 is a functional structure of the image processing apparatus shown in FIG. 1.

FIG. 2 is a functional structure of the MFP 1. As shown in FIG. 2, the MFP 1 includes a user I/F (interface) section 21, a controller 22, an application logic section 23, a device service section 24, devices 25, and a crosscut section 26.

The user I/F section 21 includes a communication server 21a and a local UI (user interface) section 21b. The user I/F section 21 receives an instruction and interprets the instruction, and sends the interpreted instruction to the controller 22. The communication server 21a receives an instruction from an external apparatus (not shown) via a network, and the local UI 21b receives an instruction from the operation displaying section 5 (see FIG. 1).

The controller 22 includes a parameter section 22a and an activity section 22b. When the controller 22 receives a user instruction via the user I/F section 21, the controller 22 stores the user instruction in the parameter section 22a, selects a component to be used from components in the application logic section 23 so as to satisfy the user instruction by using the activity section 22b, and requests the selected component to execute a process.

The application logic section 23 includes an input process component 23a, a process component 23b, an output process component 23c, and a data management component 23d. The component executes the user instruction, and is not limited to a logic component. The application logic section 23 executes the user instruction by using plural components of the components 23a through 23d. The application logic section 23 executes the components 23a through 23d based on the user instruction from the controller 22.

The device service section 24 controls devices 25a, 25b, 25c, for example, a network, a public telephone line, and the scanner section 4 of the MFP 1 based on an instruction from the application logic section 23.

The crosscut section 26 is commonly used by the sections in the MFP 1; it includes, for example, a history section 26a, an access control section 26b, and a billing section 26c, and stores history contents, access control contents, and billing contents, respectively. For example, the history section 26c is accessed from all the sections whose history contents are required to be stored, and stores the history contents of the sections.

The MFP 1 reads an image processing program for executing an image processing method from a computer-readable recording medium, loads the image processing program in a storage unit (not shown) such as a ROM (read only memory) and a HDD (hard disk drive), and causes a CPU (not shown) to execute the image processing program. As the computer-readable recording media, there are, for example a ROM, an EEPROM (electrically erasable and programmable read only memory), an EPROM (erasable and programmable read only memory), a flash memory, a flexible disk, a CD-ROM (compact disc read only memory), a CD-RW (compact disc rewritable), a DVD (digital versatile disk), an SD (secure digital) card, and a MO (magneto-optical disk).

The image processing program executes the image processing method in which a preview image of a document and/or a thumbnail image of the document is formed and stored as an image to be displayed before starting to read a next document (described below in detail).

The image processing program can be written by using legacy programming languages such as Assembler, C, C++, C#, and Java (trademark), or an object-oriented language, and can be distributed by storing the image processing program in one of the above computer-readable recording media.

The CPU forms the controller 22, the application logic section 23, and the device service section 24 based on the image processing program; and executes the functions of the above sections 22 through 24. With this, the CPU functions as a displaying image forming unit, an image rotating unit, and an image processing unit.

Next, operations of the MFP 1 according to the first embodiment of the present invention are described. The MFP 1 forms a preview image and/or a thumbnail image during a period of reading a document before starting to read a next document, and stores the formed preview image and/or the formed thumbnail image in a storage unit. The MFP 1 displays the preview image and/or the thumbnail image stored in the storage unit based on request.

In the following, a case is described in which copying operations are performed. In the MFP 1, image data of a document read by the scanner section 4 are temporarily stored in a storage unit, for example, a large capacity RAM (random access memory) or an HDD; then a preview image and/or a thumbnail image of the read document is formed and the preview image and/or the thumbnail image is stored in the storage unit by being related to the image data of the document. When a user instructs displaying the preview image and/or the thumbnail image on the display of the operation displaying section 5, the preview image and/or the thumbnail image is displayed on the display of the operation displaying section 5. In addition, when the user requests to print the image of the document, the image of the document is printed on paper by the printer section 3.

Figure 3:
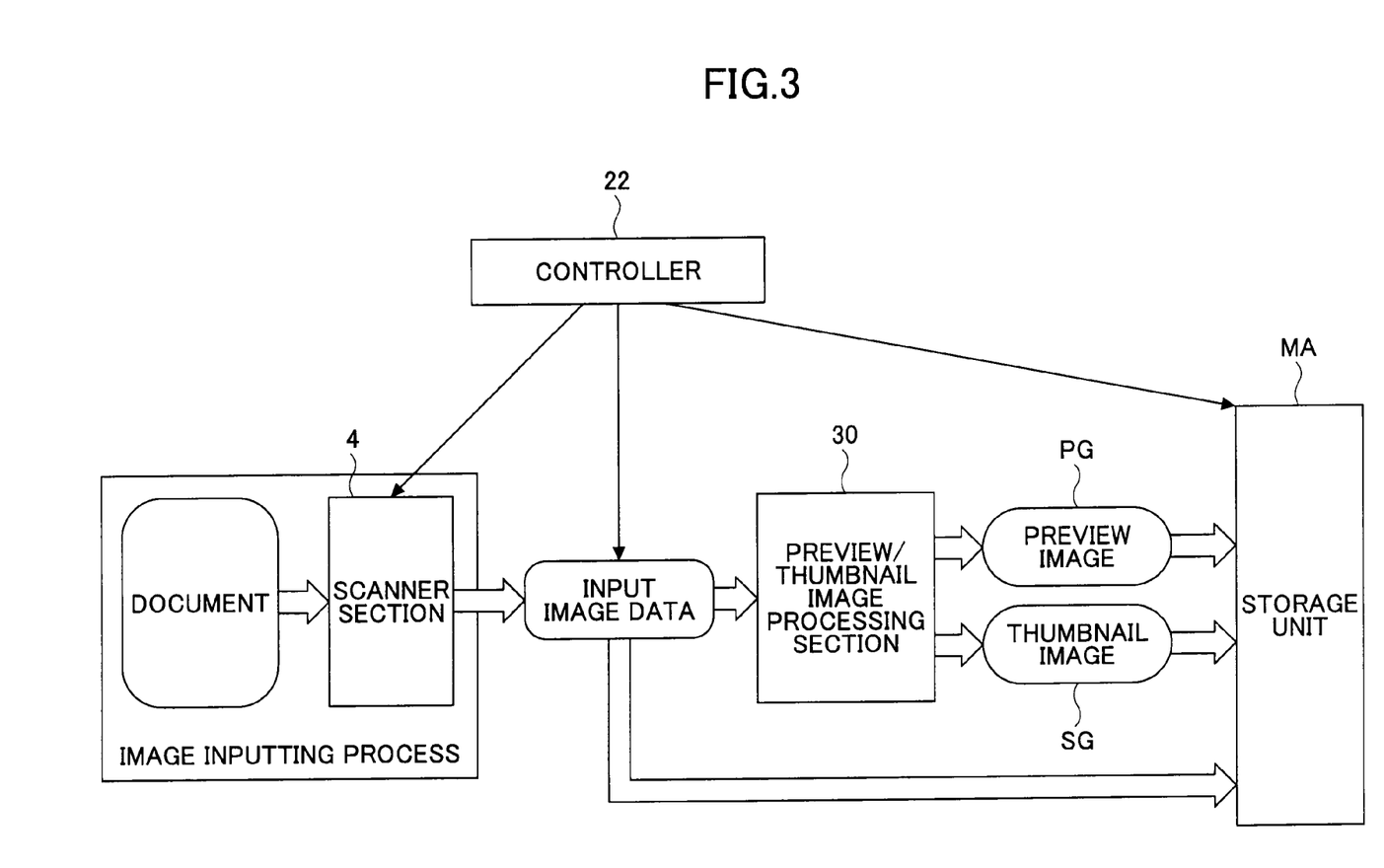
FIG. 3 is a block diagram showing an image processing flow in the image processing apparatus shown in FIG. 1.

FIG. 3 is a block diagram showing an image processing flow in the MFP 1 according to the first embodiment of the present invention.

When plural documents are put on the ADF 6, an operating instruction for copying the documents is input on the display of the operation displaying section 5, and a start key is pushed; the controller 22 sends a first document to the scanner section 4 by separating the first document from the plural documents, and the scanner section 4 performs an image inputting process (image reading process).

Next, the preview/thumbnail image processing section 30 forms a preview image PG and/or a thumbnail image SG (image to be displayed) from the image data input by the scanner section 4, and the preview image PG and/or the thumbnail image SG is stored in a storage unit MA so that the preview image PG and/or the thumbnail image SG is related to the image data of the first document.

The preview/thumbnail processing section 30 is realized by using necessary components of the components 23a through 23d in the application logic section 23 under control of the controller 22. When a preview image displaying instruction is input on the display of the operation displaying section 5, the preview image PG and/or the thumbnail image SG of the document is displayed on the display of the operation displaying section 5 by using the preview image PG and/or the thumbnail image SG which has been stored in the storage unit MA. Further, when a copying instruction is input on the display of the operation displaying section 5, the printer section 3 prints the document on paper by reading the image data of the document from the storage unit MA.

Figure 4:
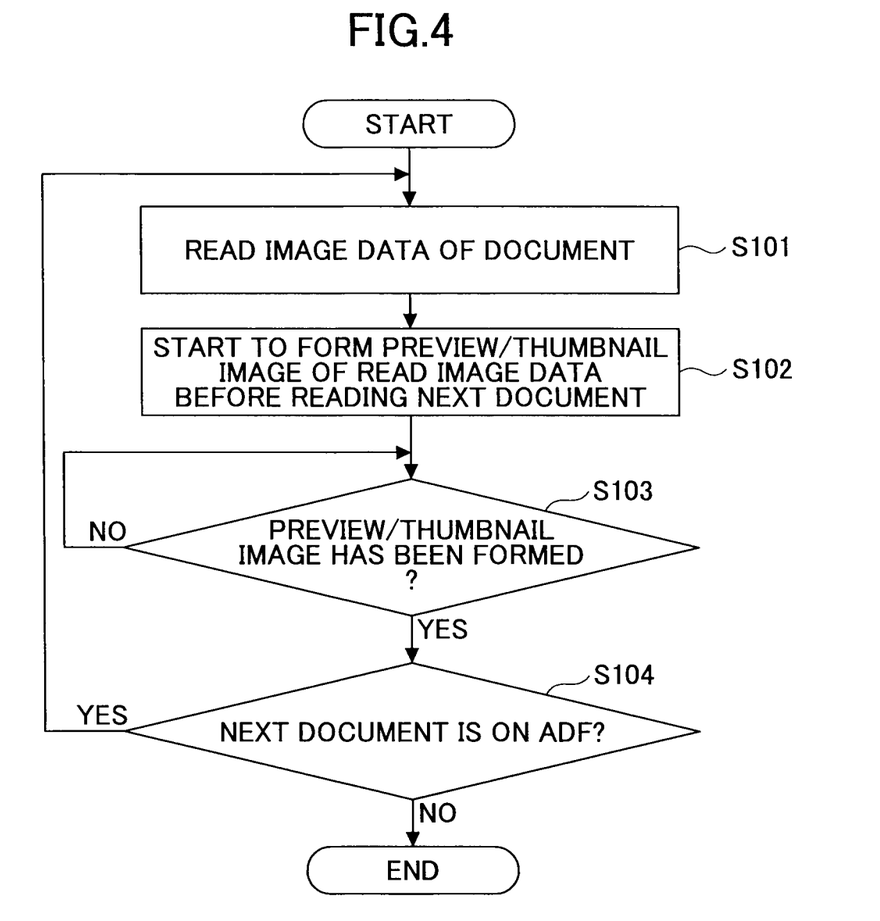
FIG. 4 is a flowchart showing a preview image/thumbnail image forming process in the image processing apparatus shown in FIG. 1.

FIG. 4 is a flowchart showing a preview image/thumbnail image forming process in the MFP 1 according to the first embodiment of the present invention. The preview image/thumbnail image forming process includes an image reading process.

Referring to FIG. 4, the preview image/the thumbnail image forming process is described in detail.

When plural documents are put on the ADF 6, an operating instruction for reading the documents is input on the display of the operation displaying section 5, and a start key is pushed; the MFP 1 sends a (first) document to the scanner section 4 by separating the first document from the plural documents, and the scanner section 4 reads image data of the first document (S101). The MFP 1 stores the read image data (RGB data) in the storage unit MA, and starts to form a preview image PG and/or a thumbnail image SG of the read image data at the preview/thumbnail processing section 30 before starting to read a second (next) document (S102).

The MFP 1 determines whether the preview image PG and/or the thumbnail image SG of the first document has been formed (S103). When the preview image PG and/or the thumbnail image SG of the first document has been formed (YES in S103), the MFP 1 stores the preview image PG and/or the thumbnail image SG of the first document in the storage unit MA so that the preview image PG and/or the thumbnail image SG of the first document is related to the image data of the first document, and confirms whether a next (second) document is on the ADF 6 (S104).

When a second document is on the ADF 6, the process returns to S101, and processes S101 through S104 are repeated. The MFP 1 repeats the processes S101 through S104 until all the documents on the ADF 6 are read. When all the documents on the ADF 6 are read (NO in S104), the preview image/the thumbnail image forming process ends.

Figure 5:
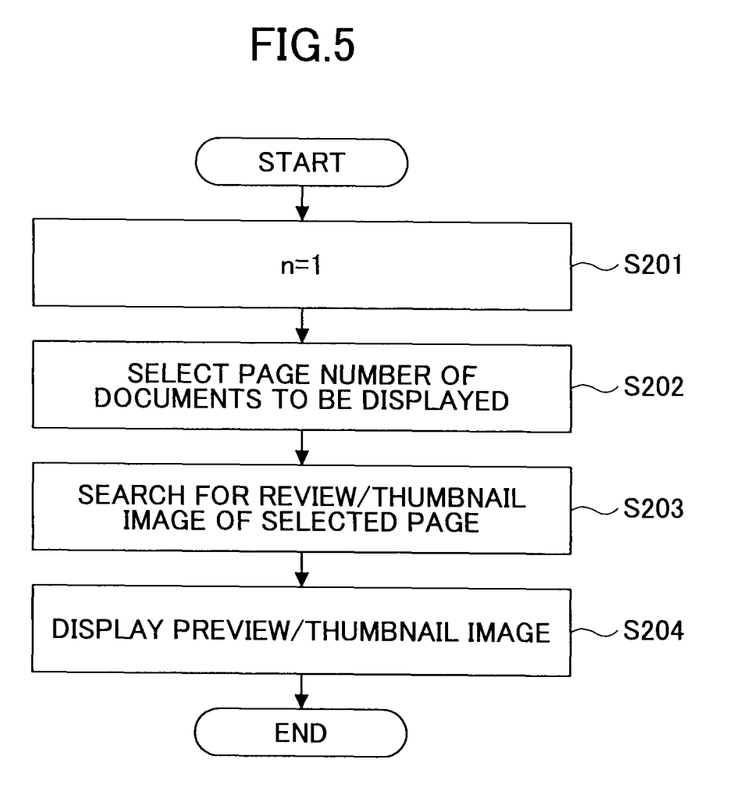
FIG. 5 is a flowchart showing a preview image/thumbnail image displaying process in the image processing apparatus shown in FIG. 1.

FIG. 5 is a flowchart showing a preview image/thumbnail image displaying process in the MFP 1 according to the first embodiment of the present invention.

Referring to FIG. 5, the preview image/thumbnail image displaying process is described in detail.

After forming the preview image PG and/or the thumbnail image SG, the MFP 1 performs the preview image PG/the thumbnail image SG displaying process based on an instruction input on the display of the operation displaying section 5.

That is, when the preview image PG and/or the thumbnail image SG has been stored in the storage unit MA and an instruction to display the preview image PG and/or the thumbnail image SG is input on the display of the operation displaying section 5, the MFP 1 displays the preview image PG and/or the thumbnail image SG on the display of the operation displaying section 5.

In FIG. 5, first, the MFP 1 sets a function "n" which designates a page number of the documents to be displayed to be "1" (initial value) (S201). When the page number "n" (function) to be displayed is selected on the display of the operation displaying section 5 (S202), the preview image PG and/or the thumbnail image SG of the selected page of the documents is searched for in the storage unit MA (S203). The MFP 1 reads the searched preview image PG and/or the searched thumbnail image SG from the storage unit MA, and displays the preview image PG and/or the thumbnail image SG on the display of the operation displaying section 5 (S204). For example, as shown in FIG. 6, the preview image PG is displayed on a preview image screen G1 of the display in the operation displaying section 5.

Figure 6:
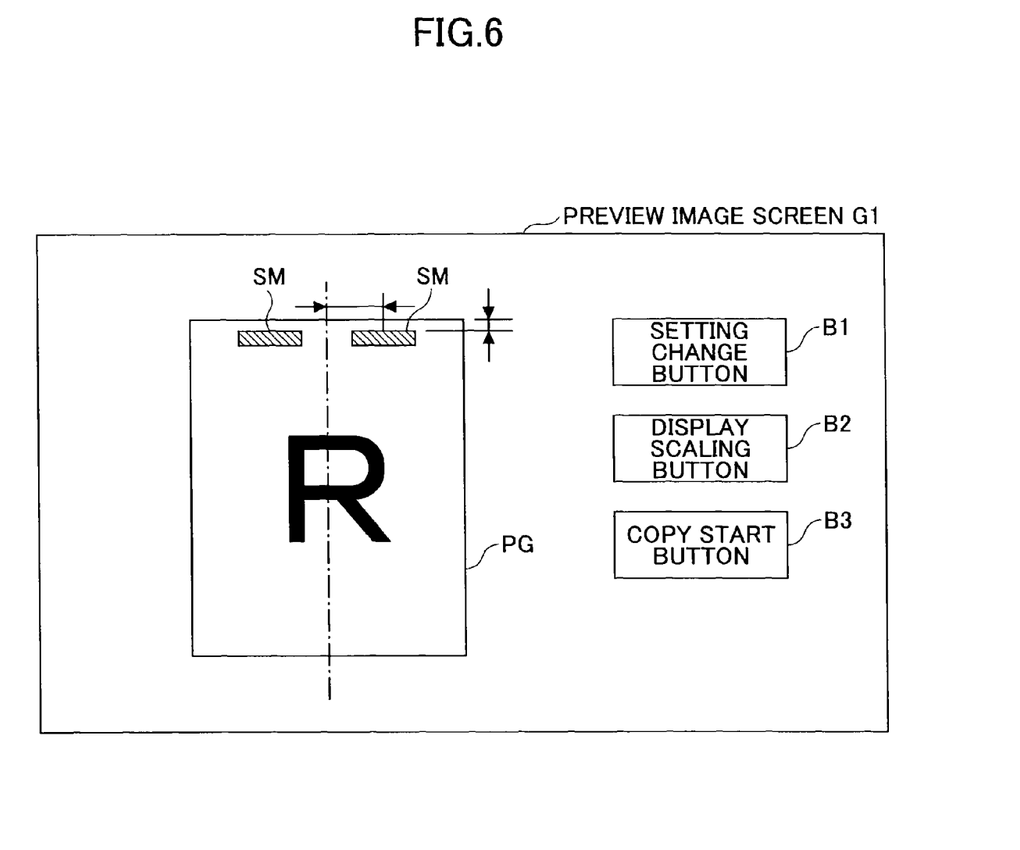
FIG. 6 is a diagram showing a preview image screen on which a preview image is displayed in the image processing apparatus shown in FIG. 1.

FIG. 6 is a diagram showing the preview image screen G1 on which the preview image PG is displayed in the MFP 1 according to the first embodiment of the present invention.

In FIG. 6, the preview image PG, a setting change button B1 for changing a print output setting, a display scaling button B2 for changing a scaling factor of the preview image PG, and a copy start button B3 for starting to copy the document are displayed on the preview image screen G1. In addition, in FIG. 6, stapling marks SM for showing stapling positions are shown. The stapling is performed by the finisher 10 after the documents are printed on paper by the printer section 3.

As described above, according to the first embodiment of the present invention, a preview image PG and/or a thumbnail image SG (image to be displayed) of a document is formed from image data of the document read by the scanner section 4, and the formed preview image PG and/or the formed thumbnail image SG is stored by being related to the read document in the storage unit MA. At this time, the preview image PG and/or the thumbnail image SG of a first document of plural documents is formed before starting to read a second (next) document of the plural documents, and the formed preview image PG and/or the formed thumbnail image SG is stored in the storage unit MA.

Since the preview image PG and/or the thumbnail image SG of the first document is stored in the storage unit MA before starting to read the next (second) document, a memory area of the storage unit MA can be effectively used and the documents can be read while sustaining the productivity in reading the documents. In addition, the preview image PG and/or the thumbnail image SG can be immediately displayed by using the preview image PG and/or the thumbnail image SG which has been stored in the storage unit MA. Therefore, the usability can be increased.

That is, generally, in an image processing apparatus, when a preview image and/or a thumbnail image is formed, a basic image for forming the preview image and/or the thumbnail image is formed from image data of a document, and the basic image is temporarily stored in a storage unit. When the preview image and/or the thumbnail image has been formed, the basic image is deleted from the storage unit. Since the basic image is deleted after forming the preview image and/or the thumbnail image, a large area in the storage unit is used by the basic image.

As described above, in the MFP 1 according to the first embodiment of the present invention, when several lines of a document are read and image data of the document are started to be formed, a preview image PG and/or a thumbnail image of the document is started to be formed, and the preview image PG and/or the thumbnail image SG of the document is formed before starting to read a next document. In this case, a basic image for forming the preview image PG and/or the thumbnail image SG is formed. However, when the image PG and/or the thumbnail image SG has been formed, the basic image can be deleted from the storage unit MA. Therefore, the memory area of the storage unit MA can be effectively used and the productivity can be increased while forming the preview image PG and/or the thumbnail image SG.

Second Embodiment

Referring to the drawings, a second embodiment of the present invention is described.

In the second embodiment of the present invention, when an element is similar to or the same as that in the first embodiment of the present invention, the same reference number as that in the first embodiment is used.

In the second embodiment of the present invention, a preview image PG and/or a thumbnail image SG is formed by rotating the direction of a document from the originally putting direction on the ADF 6 and the formed image is stored in the storage unit MA.

The direction of the preview image PG and/or the thumbnail image SG is made to be a direction from which the user can suitably observe the preview image PG and/or the thumbnail image SG when the preview image PG and/or the thumbnail image SG is displayed on the display of the operation displaying section 5. Alternatively, when the document is printed by the printer section 3, the direction of the preview image PG and/or the thumbnail image SG is made to be the same as the direction of the printed copy.

Figure 7:
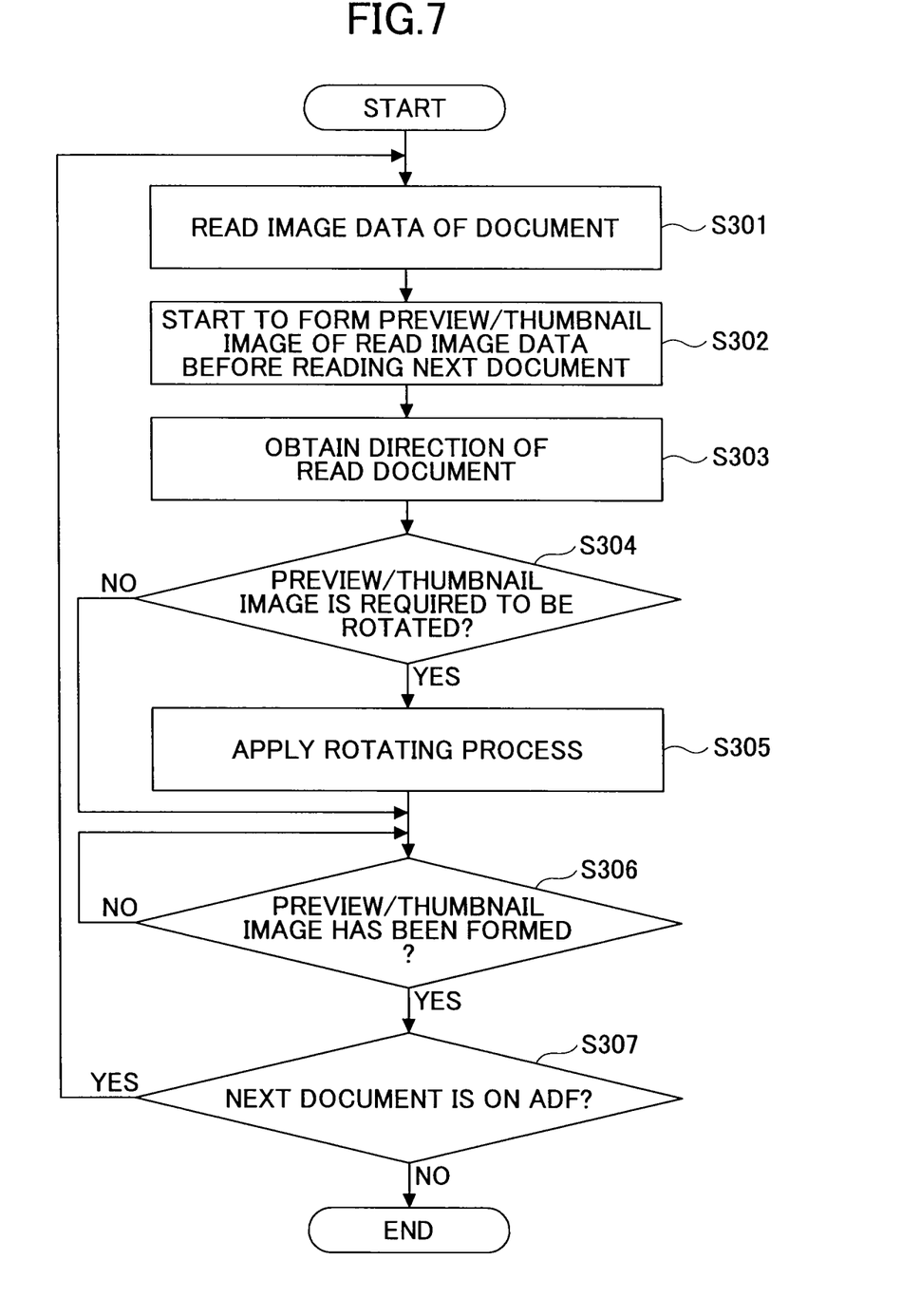
FIG. 7 is a flowchart showing a first preview image/thumbnail image forming process in the image processing apparatus according to a second embodiment of the present invention.

FIG. 7 is a flowchart showing a first preview image/thumbnail image forming process in the MFP 1 according to the second embodiment of the present invention. The preview image/thumbnail image forming process includes an image reading process.

Referring to FIG. 7, the first preview image/thumbnail image forming process in the MFP 1 according to the second embodiment of the present invention is described. In the first preview image/thumbnail image forming process in the MFP 1 according to the second embodiment of the present invention, the direction of the preview image PG and/or the thumbnail image SG is made to be a direction from which the user can suitably observe the preview image PG and/or the thumbnail image SG when the preview image PG and/or the thumbnail image SG is displayed on the display of the operation displaying section 6.

That is, in a case where a document is read by the scanner section 4, from a relationship between shapes of a document putting position on the ADF 6 and/or the shape of the scanner section 4 and the size of the document, when a preview image PG and/or a thumbnail image SG of the document is formed with the putting direction of the document, the direction of the preview image PG and/or the thumbnail image SG is not always the direction from which the user can easily read the preview image PG and/or the thumbnail image SG. In this case, in some cases, the user cannot easily observe the preview image PG and/or the thumbnail image SG of the document.

When the preview image PG and/or the thumbnail image SG of the document is displayed on the display of the operation displaying section 5 by changing the direction of the preview image PG and/or the thumbnail image SG to a direction suitable for the user, time is required in the displaying process. Therefore, a rotating process is applied to the preview image PG and/or the thumbnail image SG when the preview image PG and/or the thumbnail image SG is formed, and the rotated preview image PG and/or the rotated thumbnail image is stored in the storage unit MA.

When plural documents are put on the ADF 6, an operating instruction for reading the documents is input on the display of the operation displaying section 5, and a start key is pushed; the MFP 1 sends a first document to the scanner section 4 by separating the first document from the plural documents, and the scanner section 4 reads image data of the first document (S301). The MFP 1 stores the read image data (RGB data) in the storage unit MA, and starts to form a preview image PG and/or a thumbnail image SG of the read image data at the preview/thumbnail processing section 30 before starting to read a second document (S302).

Next, the MFP 1 obtains a direction of the read document (S303). Then the MFP 1 determines whether a direction of the preview image PG and/or the thumbnail image SG is required to be rotated by comparing the obtained direction of the document with the direction of the preview image PG and/or the thumbnail image SG of the read document (S304). In S303, the direction of the document can be obtained from the display of the operation displaying section 5 by displaying the direction of the document. In addition, in S304, a rotating direction and a rotating angle of the preview image PG and/or the thumbnail image SG can be displayed on the display of the operation displaying section 5.

When the direction of the preview image PG and/or the thumbnail image SG is required to be rotated (YES in S304), the MFP 1 applies a rotating process to the preview image PG and/or the thumbnail image SG (S305). Next, the MFP 1 determines whether the preview image PG and/or the thumbnail image SG of the first document has been formed (S306). When the preview image PG and/or the thumbnail image SG of the first document has been formed (YES in S306), the MFP 1 stores the preview image PG and/or the thumbnail image SG of the first document in the storage unit MA so that the preview image PG and/or the thumbnail image SG of the first document is related to the image data of the first document, and confirms whether a second (next) document is on the ADF 6 (S307).

When a second document is on the ADF 6 (YES in S307), the process returns to S301, and processes S301 through S307 are repeated. The MFP 1 repeats the processes S301 through S307 until all the documents on the ADF 6 are read. When all the documents on the ADF 6 are read (NO in S307), the preview image/the thumbnail image forming process ends.

When the direction of the preview image PG and/or the thumbnail image SG is not required to be rotated (NO in S304), the process goes to S306 without applying the rotating process to the preview image PG and/or the thumbnail image SG. Then the MFP 1 determines whether the preview image PG and/or the thumbnail image SG of the first document has been formed (S306).

As described above, in the first preview image/thumbnail image forming process in the MFP 1 according to the second embodiment of the present invention, the MFP 1 obtains the direction of the document read by the scanner section 4, and rotates the displaying direction of the preview image PG and/or the thumbnail image SG on the display of the operation displaying section 5 so that the displaying direction of the preview image PG and/or the thumbnail image SG is a suitable direction for a user. The rotated preview image PG and/or the rotated thumbnail image SG is stored in the storage unit MA.

Therefore, in the first preview image/thumbnail image forming process in the MFP 1 according to the second embodiment of the present invention, the direction of the preview image PG and/or the thumbnail image SG is rotated in the direction from which the user can suitably observe the preview image PG and/or the thumbnail image SG while maintaining the productivity at reading the documents, and the rotated preview image PG and/or the rotated thumbnail image SG is stored in the storage unit MA. Therefore, the preview image PG and/or the thumbnail image SG can be suitably observed by the user without rotating the preview image PG and/or the thumbnail image SG at the time of displaying. Consequently, the usability can be increased.

Figure 8:
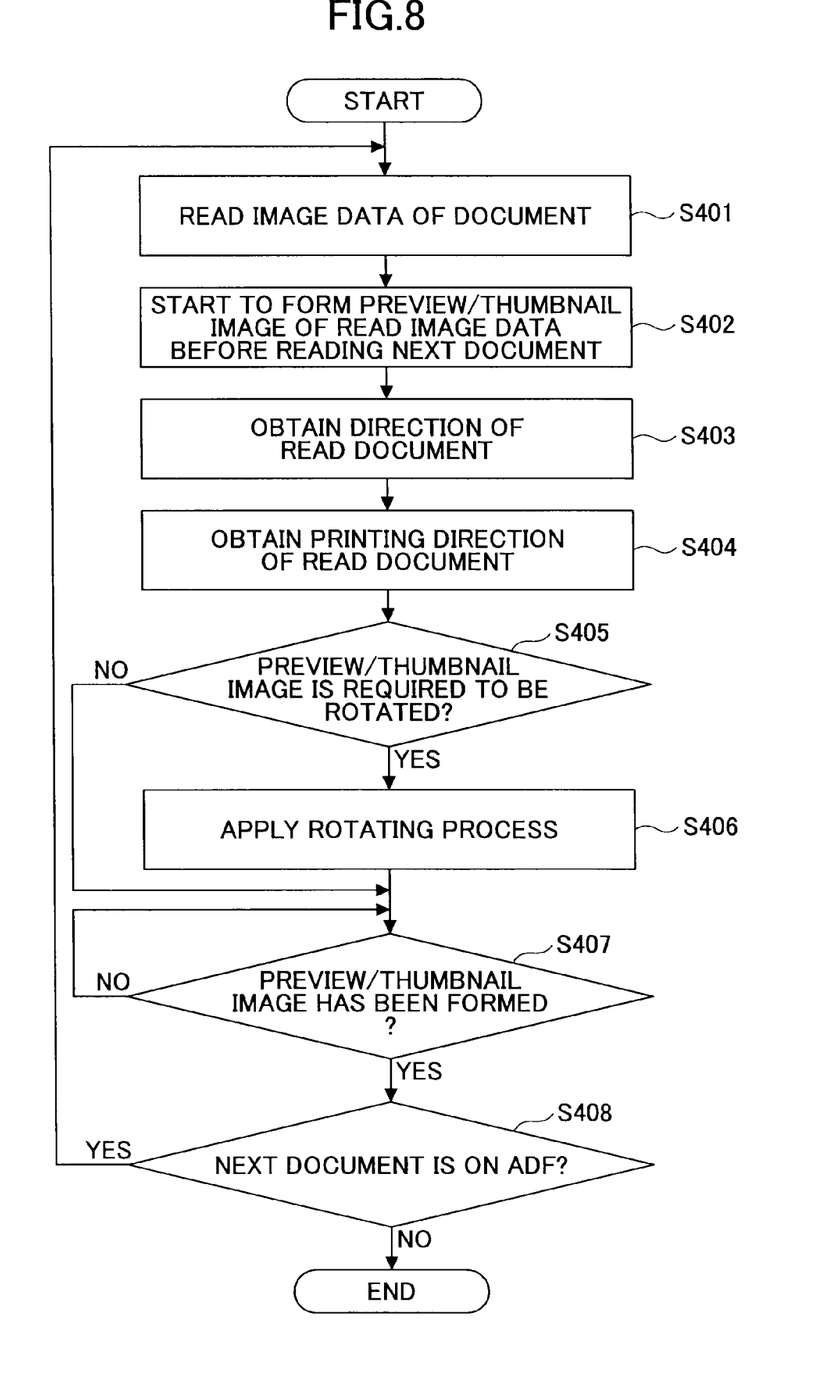
FIG. 8 is a flowchart showing a second preview image/thumbnail image forming process in the image processing apparatus according to the second embodiment of the present invention.

FIG. 8 is a flowchart showing a second preview image/ thumbnail image forming process in the MFP 1 according to the second embodiment of the present invention. The preview image/thumbnail image forming process includes an image reading process.

In the second preview image/thumbnail image forming process in the MFP 1 according to the second embodiment of the present invention, when the document is printed by the printer section 3, the direction of the preview image PG and/or the thumbnail image SG is made to be the same as the direction of the printed copy.

Referring to FIG. 8, the second preview image/thumbnail image forming process in the MFP 1 according to the second embodiment of the present invention is described.

That is, in a case where an image of a document read by the scanner section 4 is printed on paper by the printer section 3, in some cases, the read image is printed on the paper by rotating the direction of the document depending on the printing ability and/or the shape of the printer section 3. For example, in a case where a user desires to print the document in the longitudinal direction of A4-size paper (210 mm×297 mm), when the A4-size paper is not stored in the paper feeding bank 2 in the longitudinal direction and the A4-size paper is stored in the paper feeding bank 2 in the lateral direction, the read image is output by rotating the direction. At this time, in some cases, the user desires to display the preview image PG and/or the thumbnail image SG of the document in the actual printing direction.

In this case, the read image is rotated by an angle corresponding to an actual printing direction, and the preview image PG and/or the thumbnail image SG is formed based on the rotated direction and the formed preview image PG and/or the formed thumbnail image SG is stored in the storage unit MA. That is, the MFP 1 forms the preview image PG and/or the thumbnail image SG so that the direction of the preview image PG and/or the thumbnail image SG becomes the direction of the image to be printed and stores the formed preview image PG and/or the formed thumbnail image SG in the storage unit MA.

When plural documents are put on the ADF 6, an operating instruction for reading the documents is input on the display of the operation displaying section 5, and a start key is pushed; the MFP 1 sends a first document to the scanner section 4 by separating the first document from the plural documents, and the scanner section 4 reads image data of the first document (S401). The MFP 1 stores the read image data (RGB data) in the storage unit MA, and starts to form a preview image PG and/or a thumbnail image SG of the read image data at the preview/thumbnail processing section 30 before starting to read a second document (S402).

Next, the MFP 1 obtains a direction of the read document (S403). Then the MFP 1 obtains a direction of printing the read image on paper at the printer section 3 (S404). The MFP 1 determines whether a direction of the preview image PG and/or the thumbnail image SG is required to be rotated by comparing the obtained direction of the read image of the document with the printing direction of the image data (S405).

When the direction of the preview image PG and/or the thumbnail image SG is required to be rotated (YES in S405), the MFP 1 applies a rotating process to the preview image PG and/or the thumbnail image SG (S406). Next, the MFP 1 determines whether the preview image PG and/or the thumbnail image SG of the first document has been formed (S407). When the preview image PG and/or the thumbnail image SG of the first document has been formed (YES in S407), the MFP 1 stores the preview image PG and/or the thumbnail image SG of the first document in the storage unit MA so that the preview image PG and/or the thumbnail image SG of the first document is related to the image data of the first document, and confirms whether a second document is on the ADF 6 (S408).

When a second document is on the ADF 6 (YES in S408), the process returns to S401, and processes S401 through S408 are repeated. The MFP 1 repeats the processes S401 through S408 until all the documents on the ADF 6 are read. When all the documents on the ADF 6 are read (NO in S408), the preview image/the thumbnail image forming process ends.

When the direction of the preview image PG and/or the thumbnail image SG is not required to be rotated (NO in S405), the process goes to S407 without applying the rotating process to the preview image PG and/or the thumbnail image SG. Then the MFP 1 determines whether the preview image PG and/or the thumbnail image SG of the first document has been formed (S407).

As described above, in the second preview image/thumbnail image forming process in the MFP 1 according to the second embodiment of the present invention, the MFP 1 obtains the direction of the document read by the scanner section 4 and the printing direction of the document to be printed by the printer section 3, rotates the direction of the preview image PG and/or the thumbnail image SG, and stores the rotated preview image PG and/or the rotated thumbnail image SG in the storage unit MA so that the preview image PG and/or the thumbnail image SG are displayed on the display of the operation displaying section 5 to have the same direction as the printing direction of the read document when the direction of the document read by the scanner section 4 is different from the printing direction of the document by the printer section 3.

Therefore, in the second preview image/thumbnail image forming process in the MFP 1 according to the second embodiment of the present invention, the preview image PG and/or the thumbnail image SG can be displayed on the display of the operation displaying section 5 with the direction equal to the printing direction of the documents. Consequently, the user can easily confirm the output image of the documents.

Third Embodiment

Figure 9:
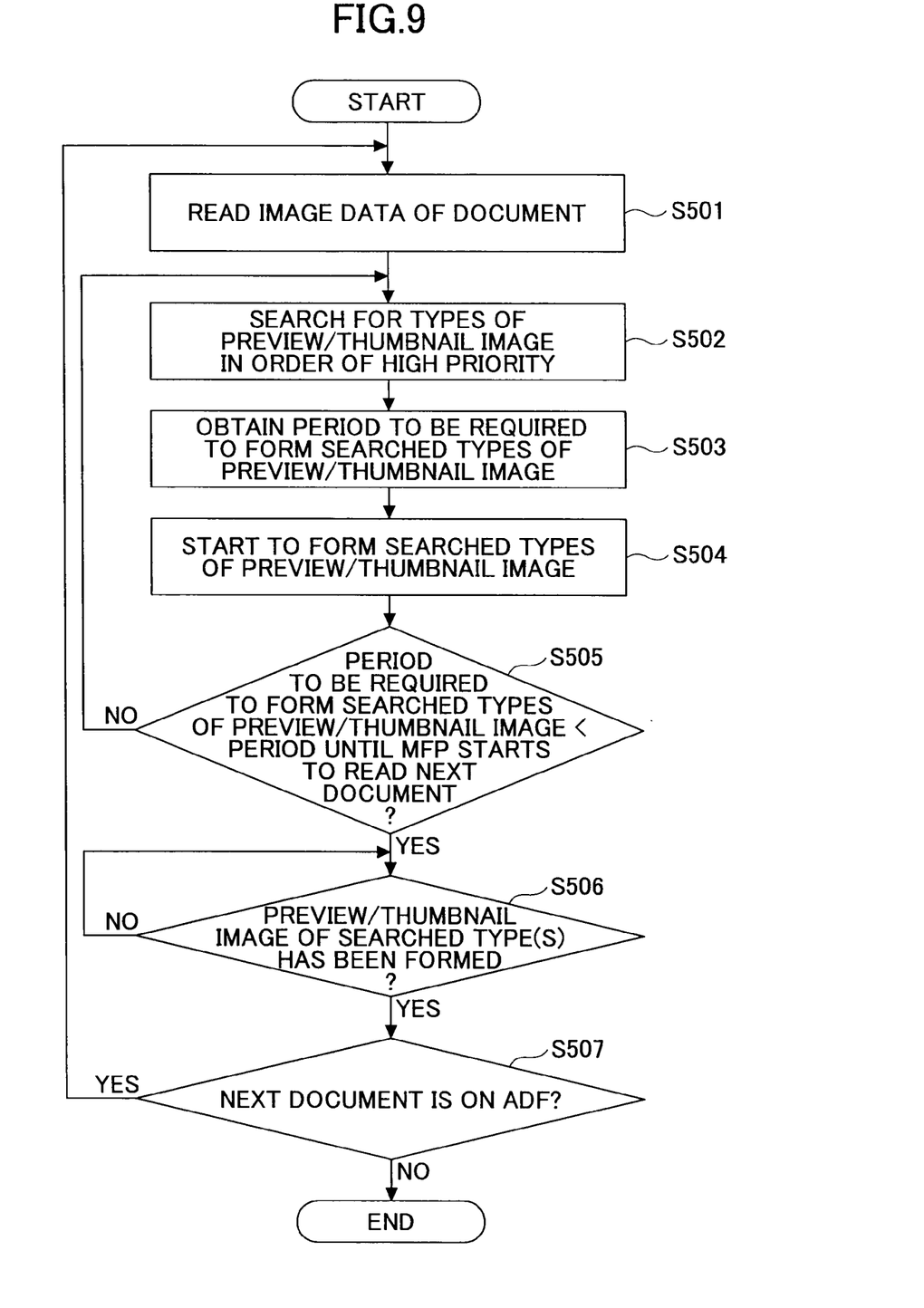
FIG. 9 is a flowchart showing a preview image/thumbnail image forming process in the image processing apparatus according to a third embodiment of the present invention.

FIG. 9 is a flowchart showing a preview image/thumbnail image forming process in the MFP 1 according to a third embodiment of the present invention. The preview image/thumbnail image forming process includes an image reading process.

In the third embodiment of the present invention, when an element is similar to or the same as that in the first embodiment of the present invention, the same reference number as that in the first embodiment is used.

In the third embodiment of the present invention, when plural types of a preview image PG and/or a thumbnail image SG are formed for one read image, the formable number of the plural types of the preview image PG and/or the thumbnail image SG is formed based on a predetermined priority order before starting to read a next document and the formed plural types of the preview image PG and/or the thumbnail image SG are stored in the storage unit MA.

That is, the number of the types of the preview image PG and/or the thumbnail image SG does not necessarily have to be one for one image of the document. For example, in some cases, a displaying pattern on the display of the operation displaying section 5 is different among plural image processing apparatuses, and the host apparatus HS connected to the MFP 1 may request to have another type of the preview image PG and/or the thumbnail image SG. In order to realize the above request, the plural types of the preview image PG and/or the thumbnail image SG are stored in the storage unit MA.

However, when all the necessary types of the preview image PG and/or the thumbnail image SG are formed, a large memory area is used in the storage unit MA, and the preview image and/or thumbnail image processing period becomes great. In this case, in some cases, all the plural types of the preview image PG and/or the thumbnail image SG may not be formed before starting to read a next document.

In order to solve the above problem, a priority order table is stored in a storage unit, for example, a non-volatile memory. In the priority order table, the types of the preview image PG and/or the thumbnail image SG, the priority order of the types, and a period to form each of the types of the preview image PG and/or the thumbnail image SG are stored.

The priority order of the types of the preview image PG and/or the thumbnail image SG has been preset in the MFP 1 as an initially set priority order. However, the priority order can be changed by a user on the display of the operation displaying section 5. The priority order is set to be high when the using times of a type of the preview image PG and/or the thumbnail image SG are great.

Referring to FIG. 9, the preview image/thumbnail image forming process in the MFP 1 according to the third embodiment of the present invention is described.

When plural documents are put on the ADF 6, an operating instruction for reading the documents is input on the display of the operation displaying section 5, and a start key is pushed; the MFP 1 sends a first document to the scanner section 4 by separating the first document from the plural documents, and the scanner section 4 reads image data of the first document (S501). The MFP 1 stores the read image data (RGB data) in the storage unit MA, and searches for types of the preview image PG and/or the thumbnail image SG in order of high priority (S502).

Next, the MFP 1 obtains a period to be required to form the searched types of the preview image PG and/or the thumbnail image SG (S503). The MFP 1 starts to form the searched types of the preview image PG and/or the thumbnail image SG at the preview/thumbnail processing section 30 before starting to read a second document (S504).

Next, the MFP 1 determines whether the period to be required to form the searched types of the preview image PG and/or the thumbnail image SG is less than a period until the MFP 1 starts to read a second (next) document (S505). When the period to be required to form the searched types of the preview image PG and/or the thumbnail image SG is not less than a period until the MFP 1 starts to read a second (next) document (NO in S505), the process returns to S502, and the MFP 1 searches for a type of the preview image PG and/or the thumbnail image SG having a lower priority (S502). Then processes from S503 through S505 are repeated.

When the period to be required to form the searched types of the preview image PG and/or the thumbnail image SG is less than a period until the MFP 1 starts to read a second (next) document (YES in S505), the MFP 1 determines whether the searched types of the preview image PG and/or the thumbnail image SG of the first document have been formed (S506).

When the searched types of the preview image PG and/or the thumbnail image SG of the first document have been formed (YES in S506), the MFP 1 stores the searched types of the preview image PG and/or the thumbnail image SG of the first document in the storage unit MA so that the searched types of the preview image PG and/or the thumbnail image SG of the first document are related to the image data of the first document. Then the MFP 1 confirms whether a second (next) document is on the ADF 6 (S507).

When a second document is on the ADF 6 (YES in S507), the process returns to S501, and processes S501 through S507 are repeated. The MFP 1 repeats the processes S501 through S507 until all the documents on the ADF 6 are read. When all the documents on the ADF 6 are read; that is, a next document is not on the ADF 6 (NO in S507), the preview image/the thumbnail image forming process ends.

In S502, when only one type of the preview image PG and/or the thumbnail image SG exists, the processes from S502 through S505 are performed for the only one type of the preview image PG and/or the thumbnail image SG.

As described above, in the third embodiment of the present invention, the formable number of plural types of the preview image PG and/or the thumbnail image SG is formed for one image of a document based on the priority order predetermined for the plural types before the MFP 1 starts to read a next document, and the formed plural types of the preview image PG and/or the thumbnail image SG are stored in the storage unit MA.

Therefore, in the third embodiment of the present invention, the preview image PG and/or the thumbnail image whose type has a high priority order can be formed and stored in the storage unit MA without decreasing document reading speed (productivity). With this, the memory area of the storage unit MA can be effectively utilized and a suitable type preview image PG and/or a suitable type thumbnail image SG can be immediately displayed on the display of the operation displaying section 5.

In the third embodiment of the present invention, in some cases, even if a desired type of the preview image PG and/or the thumbnail image SG has not been stored in the storage unit MA, another type of the preview image PG and/or the thumbnail image SG has been stored in the storage unit MA, and the other type of the preview image PG and/or the thumbnail image SG can be used. In this case, only a resolution converting process or an image rotating process is applied to the other type of the preview image PG and/or the thumbnail image SG. Therefore, the desired type of the preview image PG and/or the thumbnail image SG can be easily obtained.

As described above, the priority order of the types of the preview image PG and/or the thumbnail image SG can be determined by the user on the display of the operation displaying section 5.

Therefore, the preview image PG and/or the thumbnail image having a high priority for the user in the using environment and the using purpose can be formed and stored in the storage unit MA, and the usability can be further increased.

In addition, as described above, the priority order table is stored in a storage unit, for example, a non-volatile memory. In the priority order table, the types of the preview image PG and/or the thumbnail image SG, the priority order of the types, and a period to form each of the types of the preview image PG and/or the thumbnail image SG are stored as parameters. By using the priority order table, the types of the preview image PG and/or the thumbnail image SG are determined, and the preview image PG and/or the thumbnail image SG is formed before the MFP 1 starts to read a next document.

Therefore, a user desired type of the preview image PG and/or the thumbnail image can be efficiently and suitably formed.

As described above, the embodiments of the present invention can be used in image processing apparatus such as a document copying apparatus, a document printing apparatus, and a facsimile transmitting and receiving apparatus.

According to an embodiment of the present invention, in an image processing apparatus, when a displaying image forming unit forms an image to be displayed from image data of a document read by an image reading unit and the image to be displayed is stored in a storage unit so that the image to be displayed is related to the image data of the document, the displaying image forming unit forms the image to be displayed before the image reading unit starts to read a second document. Therefore, a memory area of the storage unit can be effectively used and the images of the documents can be read while sustaining the productivity. In addition, when the image to be displayed, for example, a preview image of the read document is displayed, the preview image of the document can be easily displayed by using the stored image to be displayed. Therefore, the usability can be increased.

Further, the present invention is not limited to the specifically disclosed embodiments, and variations and modifications may be made without departing from the scope of the present invention.

The present invention is based on Japanese Priority Patent Application No. 2008-067958, filed on Mar. 17, 2008, with the Japanese Patent Office, the entire contents of which are hereby incorporated herein by reference.

What is claimed is:

1. An image processing apparatus, comprising:
    an image reading unit which scans an image of a document and outputs image data of the scanned image;
    a displaying image forming unit which forms an image to be displayed based on the image data;
    a storage unit which stores the image to be displayed and the image data so that the image to be displayed is related to the image data; and
    a displaying unit which displays the image to be displayed stored in the storage unit;
    wherein when the image reading unit sequentially scans a plurality of documents, the displaying image forming unit forms an image to be displayed of a document and the storage unit stores the image to be displayed before the image reading unit starts to scan an image of a next document, and
    wherein the displaying unit displays the images to be displayed after the displaying image forming unit forms all of the images to be displayed from the plurality of documents.

2. The image processing apparatus as claimed in claim 1, further comprising:
    a document direction obtaining unit which obtains a direction of the document to be scanned by the image reading unit; wherein
    the displaying image forming unit includes an image rotating unit which rotates the image to be displayed of the document, and
    the displaying image forming unit rotates the image to be displayed by using the image rotating unit so that the direction of the image to be displayed becomes the direction of the document obtained by the document direction obtaining unit, and stores the rotated image to be displayed in the storage unit.

3. The image processing apparatus as claimed in claim 1, further comprising:
- a printing unit which prints on a recording medium the image of the image data of the document stored in the storage unit;
- an image processing unit which applies a predetermined process to the image data of the document scanned by the image reading unit; and
- a document direction obtaining unit which obtains a direction of the document to be scanned by the image reading unit; wherein
- the image processing unit rotates the image data of the document based on a direction of the document obtained by the document direction obtaining unit and the printing direction of the image of the document on the recording medium to be printed by the printing unit;
- the displaying image forming unit includes an image rotating unit which rotates the image to be displayed of the document, and
- the displaying image forming unit rotates the image to be displayed by using the image rotating unit so that the direction of the image to be displayed becomes the direction of the document to be printed rotated by the image processing unit, and stores the rotated image to be displayed in the storage unit.

4. The image processing apparatus as claimed in claim 1, wherein:
- the displaying image forming unit forms a plurality of types of the image to be displayed, forms a formable number of the types of the image to be displayed of a document based on a priority order determined for the types of the image to be displayed before the image reading unit starts to scan the next document, and stores the plural types of the image to be displayed in the storage unit so that the plural types of the image to be displayed of the document are related to the image data of the document.

5. The image processing apparatus as claimed in claim 4, further comprising:
- a priority order determining unit which determines the priority order of the plural types of the image to be displayed.

6. An image processing method in an image processing apparatus, comprising the steps of:
- scanning an image of a document and outputting image data of the scanned image;
- forming an image to be displayed based on the image data;
- storing the image to be displayed and the image data so that the image to be displayed is related to the image data;
- forming the image to be displayed of the document and storing the image to be displayed of the document before starting to scan an image of a next document when there is a plurality of documents to be sequentially scanned; and
- displaying the stored images to be displayed of the plurality of documents after forming all of the images to be displayed of the plurality of documents.

7. The image processing method as claimed in claim 6, further comprising the steps of:
- obtaining a direction of the document to be scanned;
- rotating the image to be displayed of the document so that the direction of the image to be displayed becomes the obtained direction of the document; and
- storing the rotated image to be displayed.

8. The image processing method as claimed in claim 6, further comprising the steps of
- obtaining a direction of the document to be printed on a recording medium;
- obtaining a direction of the image to be displayed;
- rotating the image to be displayed based on the obtained direction of the document to be printed and the obtained direction of the image to be displayed so that the direction of the image to be displayed becomes the direction of the document to be printed; and
- storing the rotated image to be displayed so that the rotated image to be displayed is related to the document to be printed.

9. The image processing method as claimed in claim 6, further comprising the steps of:
- forming a formable number of types of the image to be displayed of a document based on a priority order determined for the types of the image to be displayed before starting to scan the next document; and
- storing the formed plural types of the image to be displayed so that the plural types of the image to be displayed of the document are related to the image data of the document.

10. The image processing method as claimed in claim 9, further comprising the step of:
- determining the priority order of the plural types of the image to be displayed.

11. A non-transitory computer-readable recording medium storing an image processing program for executing in an image processing apparatus, wherein
the image processing program includes the steps of:
- scanning an image of a document and outputting image data of the scanned image;
- forming an image to be displayed based on the image data;
- storing the image to be displayed and the image data so that the image to be displayed is related to the image data;
- forming the image to be displayed of the document and storing the image to be displayed of the document before starting to scan an image of a next document when there is a plurality of documents to be sequentially scanned; and
- displaying the stored images to be displayed of the plurality of documents after forming all of the images to be displayed of the plurality of documents.

12. The non-transitory computer-readable recording medium storing the image processing program as claimed in claim 11, wherein the image processing program further includes the steps of:
- obtaining a direction of the document to be scanned;
- rotating the image to be displayed of the document so that the direction of the image to be displayed becomes the obtained direction of the document; and
- storing the rotated image to be displayed.

13. The non-transitory computer-readable recording medium storing the image processing program as claimed in claim 11, wherein
the image processing program further includes the steps of:
- obtaining a direction of the document to be printed on a recording medium;
- obtaining a direction of the image to be displayed;
- rotating the image to be displayed based on the obtained direction of the document to be printed and the obtained direction of the image to be displayed so that the direction of the image to be displayed becomes the direction of the document to be printed; and
- storing the rotated image to be displayed so that the rotated image to be displayed is related to the document to be printed.

14. The non-transitory computer-readable recording medium storing the image processing program as claimed in claim 11, wherein
 the image processing program further includes the steps of:
 forming a formable number of types of the image to be displayed of a document based on a priority order determined for the types of the image to be displayed before starting to scan the next document; and
 storing the formed plural types of the image to be displayed so that the plural types of the image to be displayed of the document are related to the image data of the document.

15. The non-transitory computer-readable recording medium storing the image processing program as claimed in claim 14, wherein
 the image processing program further includes the step of:
 determining the priority order of the plural types of the image to be displayed.

\* \* \* \* \*